N. G. VOSLER.
RAILWAY CAR.
APPLICATION FILED MAY 2, 1911.
1,036,039.
Patented Aug. 20, 1912.
2 SHEETS—SHEET 1.
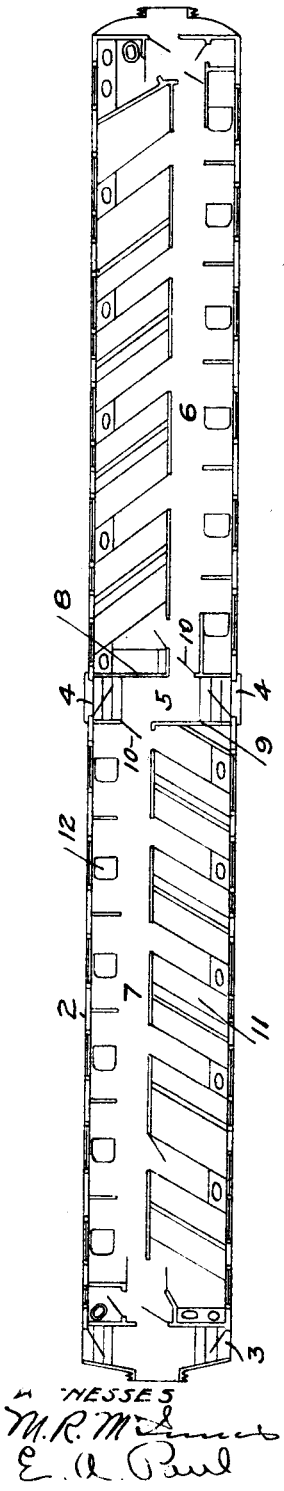
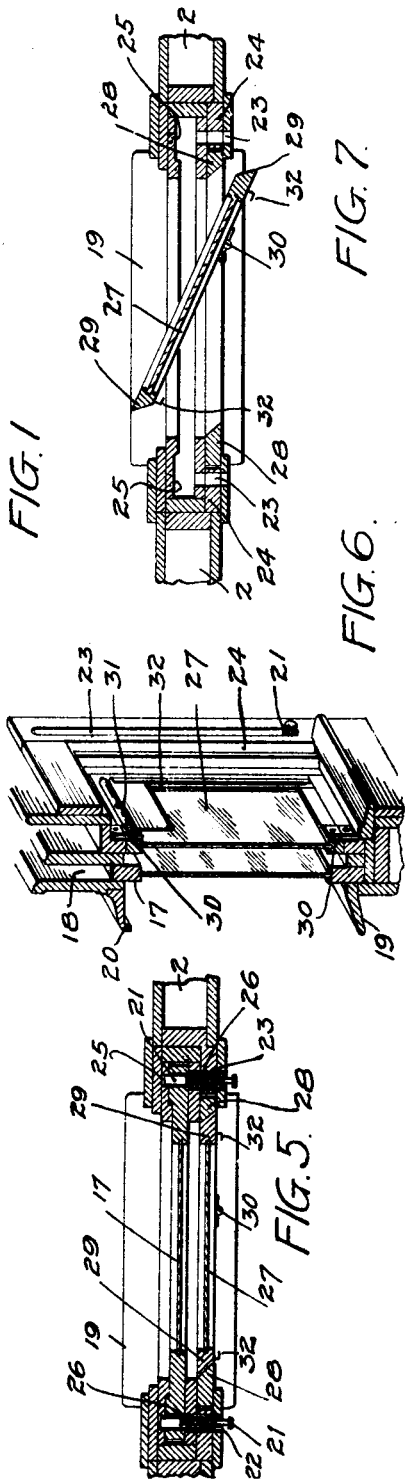
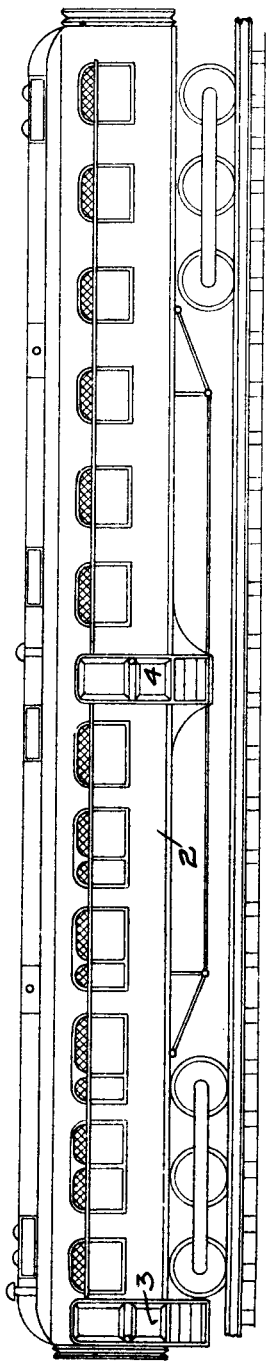
INVENTOR
NEWTON G. VOSLER

N. G. VOSLER.
RAILWAY CAR.
APPLICATION FILED MAY 2, 1911.

1,036,039.

Patented Aug. 20, 1912.
2 SHEETS—SHEET 2.

WITNESSES

INVENTOR
NEWTON G. VOSLER
BY
Paul & Paul
HIS ATTORNEYS

UNITED STATES PATENT OFFICE.

NEWTON G. VOSLER, OF MINNEAPOLIS, MINNESOTA.

RAILWAY-CAR.

1,036,039.

Specification of Letters Patent. Patented Aug. 20, 1912.

Application filed May 2, 1911. Serial No. 624,526.

*To all whom it may concern:*

Be it known that I, NEWTON G. VOSLER, of Minneapolis, Hennepin county, Minnesota, have invented certain new and useful Improvements in Railway-Cars, of which the following is a specification.

The object of my invention is to provide a car which can be divided transversely so that one portion of the car may be chartered by a private party while the other portion is accessible to the public.

A further object is to provide a car which can receive and discharge its passengers faster than a car as ordinarily constructed and which, in case of a wreck, will have convenient exits for the passengers.

A further object is to provide an improved window construction and an improved ventilating system for the car.

Other objects of the invention will appear from the following detailed description.

The invention consists generally in a car having a transverse, centrally arranged vestibule and side entrances therefor, said vestibule dividing the car into independent compartments.

Further the invention consists in an improved form of window and improved means for opening the window for ventilating purposes.

Further the invention consists in interposing a ceiling between the roof and the side walls of the car.

Further the invention consists in vertical partitions entirely separating the compartments of the car from the transverse vestibule.

Further the invention consists in providing an air space in the top of the car between the ceiling and the roof.

Further the invention consists in various constructions and combinations, all as hereinafter described and particularly pointed out in the claims.

Figure 3:
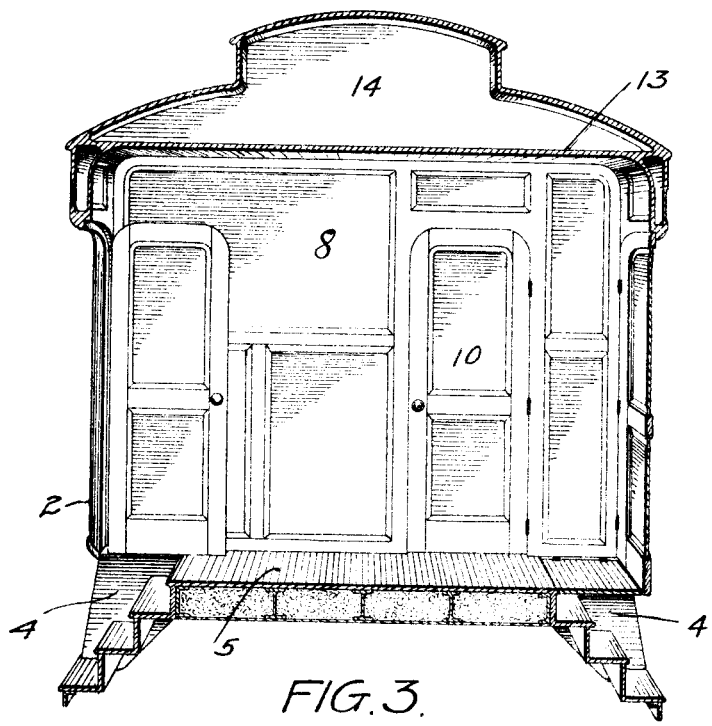
Figure 4:
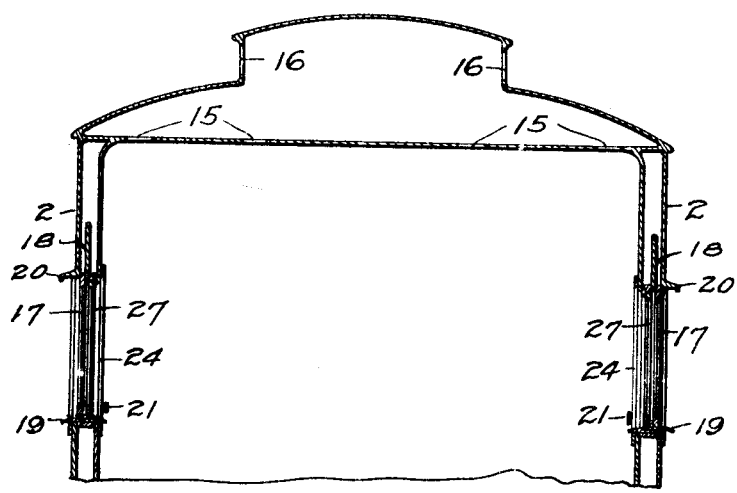

In the accompanying drawings forming part of this specification, Figure 1 is a longitudinal, sectional view through the upper portion of a car with my invention applied thereto, Fig. 2 is a side elevation of the same, Fig. 3 is a transverse sectional view, through the middle portion of the car, showing the arrangement of the vestibule partitions, Fig. 4 is a similar view, showing the position of the windows with respect to the side walls of the car, and the ventilating openings in the car ceiling and roof, Fig. 5 is a detail sectional view showing the window construction, Fig. 6 is a perspective view of the same, Fig. 7 is a detail sectional view showing the inner sash in its open position.

In the drawing, 2 represents the body of the car having a side entrance 3 at one end and also provided with a middle entrance 4 leading to a transverse vestibule 5 which extends entirely across the car, dividing it into two rooms or compartments 6 and 7. The vestibule has partitions 8 and 9 provided with doors 10 which separate the vestibule from the car compartments. One of these doors is on one side of the longitudinal center of the car and the other on the opposite side, the berths 11 and the chairs 12 being similarly arranged to balance the load in the car. The vestibule partitions extend from the floor to the roof of the car and form upright walls separating one compartment of the car from the other so that in case of fire in one compartment the smoke and gases will not enter the other compartment and in case of a car of steel construction these partitions may be made fire-proof so that a fire in one compartment cannot spread to the other one, and, if desired, one compartment may be used as a smoker without any annoyance to the passengers in the other compartment.

The berths form the subject-matter of a companion application herewith and need no detailed description or illustration at this time.

When the doors 10 are closed the vestibule will be entirely cut off from each end of the car and one end of the car may be chartered for private use while the other end may be opened to the public, and the end of the car that is chartered may be entered at the side and be cut off from the remainder of the car and allow the occupants to maintain the same degree of privacy as they could if they had the entire car to themselves. This arrangement adapts the car particularly for small parties who may wish a portion of a car to themselves but do not need the space of an entire car. By dividing the car transversely with the vestibule I am able to utilize a portion of it for public use, accommodating way passengers, while the remainder of the car may be reserved and kept entirely private.

I have shown each compartment equipped with berths and chairs, but any other arrangement may be made that is suitable or desirable. A car constructed in this way can receive and discharge its passengers in much quicker time than where only the end entrances are provided and is case of wreck of the train the vestibule and side entrances afford additional means of escape for the passengers and frequently, if the car is lying on one side, the upper side entrance may be the only means of escape except through the windows, as frequently, in a case of this kind, the doors at the end will be blocked or jammed so that exit at that point is prevented.

13 represents a ceiling extending lengthwise of the car under the roof, an air circulating chamber 14 being formed between the ceiling and the roof. This ceiling may have ventilating openings 15 therein at intervals and similar openings 16 may be formed in the upper portion of the roof. These openings may be screened in a suitable manner to prevent the entrance of dust and cinders. The ceiling will, to a large extent, render the car cooler in summer, aided by the circulation of air through the chamber 14, and will also aid in maintaining a more uniform temperature in the car in cold weather.

In Figs. 5, 6 and 7 I have shown an improved construction of window for the car, consisting of an outer sash 17 that is vertically slidable in a sash pocket 18 formed in the side walls of the car, a projecting ledge 19 being preferably provided at the bottom of the window and an overhanging shelf 20 at the top of the window. This shelf is designed to shed rain or snow and will also, to a certain extent, deflect dirt and cinders from the window. The outer sash is raised by means of pins 21 which fit into sockets 22 in the side rails of the sash and are vertically slidable in slots 23 provided in the window casing 24, said pins having finger grips at their inner ends. The window frame is provided with sockets 25 to receive the outer ends of the pins 21 to lock the outer sash in its closed position, said pins being normally held in said sockets by springs 26. The inner sash 27 has side rails for n two parts, 28 and 29, the inner sash be ng vertically slidable in the pocket 18'. (See Fig. 6). The inner side rails or stiles have top and bottom rails coöperating with those at the sides to support the glass 27 and the said top and bottom rails are adapted to swing on pivots 30 mounted in the top and bottom rails of the stiles 28, suitable means, not shown, being provided for supporting the inner sash in its raised position. The movable portion of the inner sash is adapted to swing on the pivot pins 30 a limited distance when the outer sash is closed, and may be swung to the position shown in Fig. 7 when the outer sash is raised. This raising of the outer sash is accomplished by grasping the pins 21 to withdraw them from the sockets 25 and then lifting the outer sash into its pocket 18. The inner sash may then be raised into its pocket and the movable portion thereof swung on its pivots to admit the desired amount of air, the sash serving as a deflector to direct the dust and cinders away from the open window. A suitable curtain 21 is mounted on the inner sash and is vertically slidable in guides 32 and may be moved with the entire sash up into the pocket 18'.

I do not wish to be confined in this application to the means shown for raising and lowering the outer sash, as other devices may be employed for this purpose and in various other ways the details of construction of the window may be modified and still be within the scope of my invention. The width of the vestibule may also be varied, as well as the position of the doors in the partitions, and the position of the transverse vestibule in the car may be changed if it is desired to make one compartment larger than the other. Generally, however, the transverse vestibule will be located in the middle of the car, as it will present a better appearance on the outside of the car if equally spaced from the ends thereof.

I may divide the chamber 14 by transverse partitions between the ends of the car and the vestibule so that the air entering one end of a compartment will pass down into the car and circulate therein, and from thence up through the ventilating openings in the ceiling into the space on the other side of the transverse partitions, and from thence out through the openings in the roof of the car.

I claim as my invention:—

1. A railway car having a middle entrance on each side thereof and a transverse vestibule extending across the car from side to side, said vestibule having partitions extending from side to side of the car and dividing its interior into independent compartments, said partitions having door openings therein and doors therefor upon opposite sides of the longitudinal center line of the car, each compartment having an aisle running lengthwise thereof on opposite sides of the longitudinal center line of the car leading respectively to the door openings in said vestibule, and seats provided in said compartments upon each side of the aisles therein.

2. A railway car having an end vestibule and entrances on each side of the car leading to said vestibule and a door leading from said vestibule to the interior of the car, said car also having middle entrances on each side thereof and a transverse vestibule extending across the car from side to side, said vestibule having partitions extending from the floor to the ceiling of the car and provided with door openings and doors therefor, said openings being in staggered relation with one another, one upon each side of the longitudinal center line of the car, said transverse vestibule dividing the interior of the car into independent compartments, each compartment having an aisle on one side of the longitudinal center line of the car leading to the vestibule door on that side and seats provided in said compartments upon each side of the aisles therein.

3. A railway car having an end vestibule and entrances thereto and side entrances near the middle of the car and a transverse vestibule having partitions extending from side to side of the car and dividing its interior into independent compartments, said partitions having door openings therein and doors therefor upon opposite sides of the longitudinal center line of the car, each compartment having an aisle running lengthwise thereof on opposite sides of the longitudinal center line of the car and leading to the door openings respectively in said vestibule, a series of single seats provided in said compartments on one side of the aisles therein, and a series of double seats provided in said compartments on the opposite side of the aisles therein.

4. A railway car having a vestibule at one end and an entrance on each side of the car communicating therewith, said vestibule having a door opening leading to the interior of the car, said car having a middle entrance on each side thereof and vertical partitions extending across the car from side to side and forming a continuous transverse vestibule dividing the interior of the car into independent compartments, said partitions having openings therein and doors therefor, each compartment having an aisle running lengthwise of the compartment at one side of the longitudinal center line of the car and leading to said vestibule openings, a series of seats arranged on one side of the car in one compartment and on the other side of the car in the other compartment, said seats being diagonally arranged with respect to the longitudinal center line of the car.

5. A railway car having a middle entrance on each side thereof, partition walls extending across the car from side to side and forming a transverse vestibule and dividing the interior of the car into independent compartments, a ceiling extending from end to end of the car and from side to side thereof and connecting with said partitions to separate one compartment from the other and from said vestibule, said partitions having doors therein on opposite sides of the longitudinal center line of the car, said compartments having aisles on opposite sides of the longitudinal center line of the car leading to said doors and seats in said compartments upon opposite sides of said aisles.

6. A railway car having an end entrance and a middle entrance on each side of the car and doors for each middle entrance, and a transverse vestibule extending entirely across the car from side to side, said vestibule having a partition on each side thereof extending across the car from side to side and separating the vestibule from the end portions of the car and forming independent compartments in the ends of the car, said partitions having doors therein leading from said vestibule to said compartments, said doors being upon opposite sides of the longitudinal center line of the car and said compartments having aisles in line with the partition door openings and also upon opposite sides of the longitudinal center line of the car, and seats in said compartments.

In witness whereof, I have hereunto set my hand this 29" day of April 1911.

NEWTON G. VOSLER.

Witnesses:
GENEVIEVE E. SORENSEN
C. H. REHFUSS.